H. L. HOPKINS.
MOWER OR HARVESTER.
APPLICATION FILED FEB. 20, 1905.

980,782.

Patented Jan. 3, 1911.
8 SHEETS—SHEET 2.

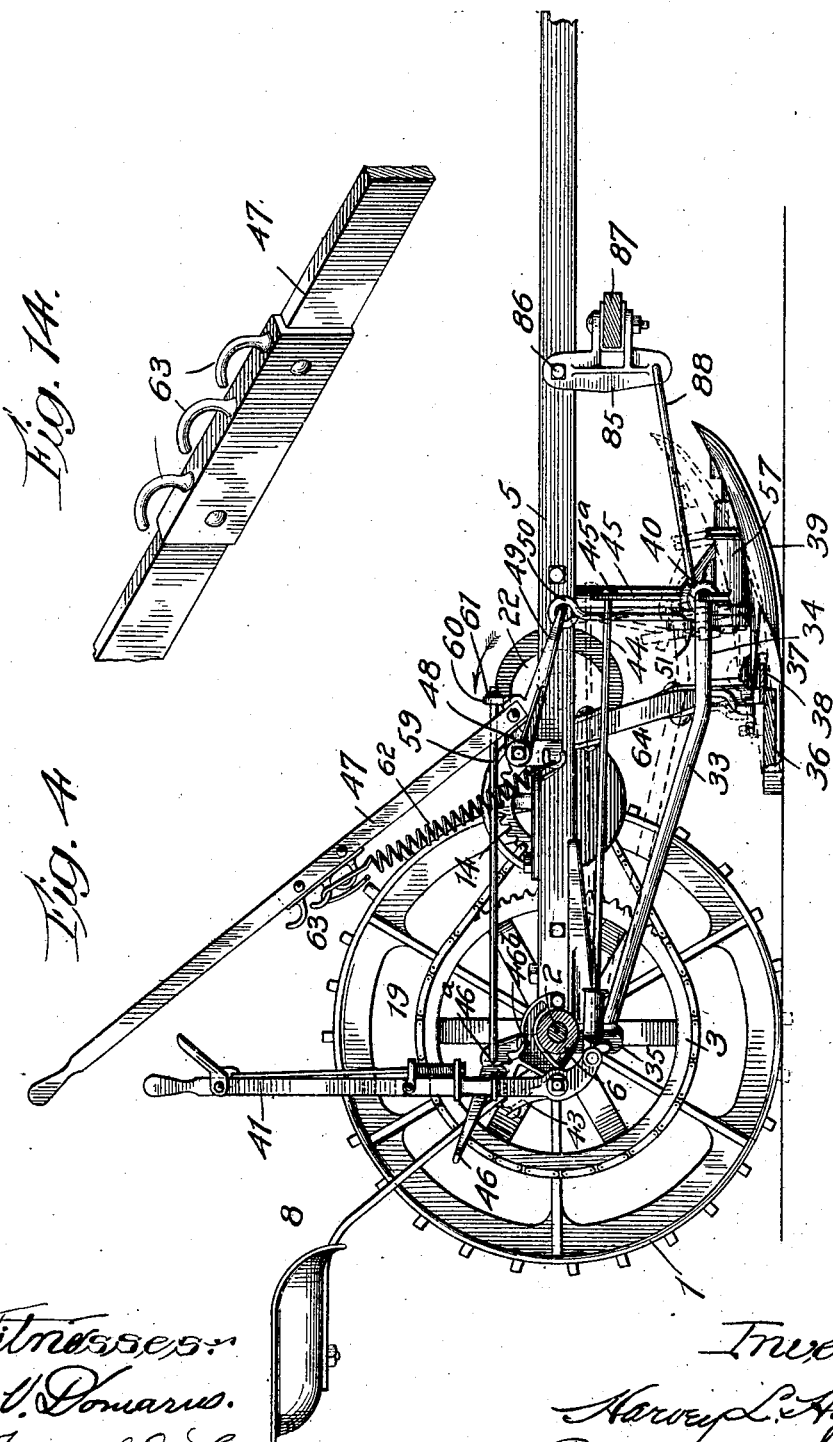

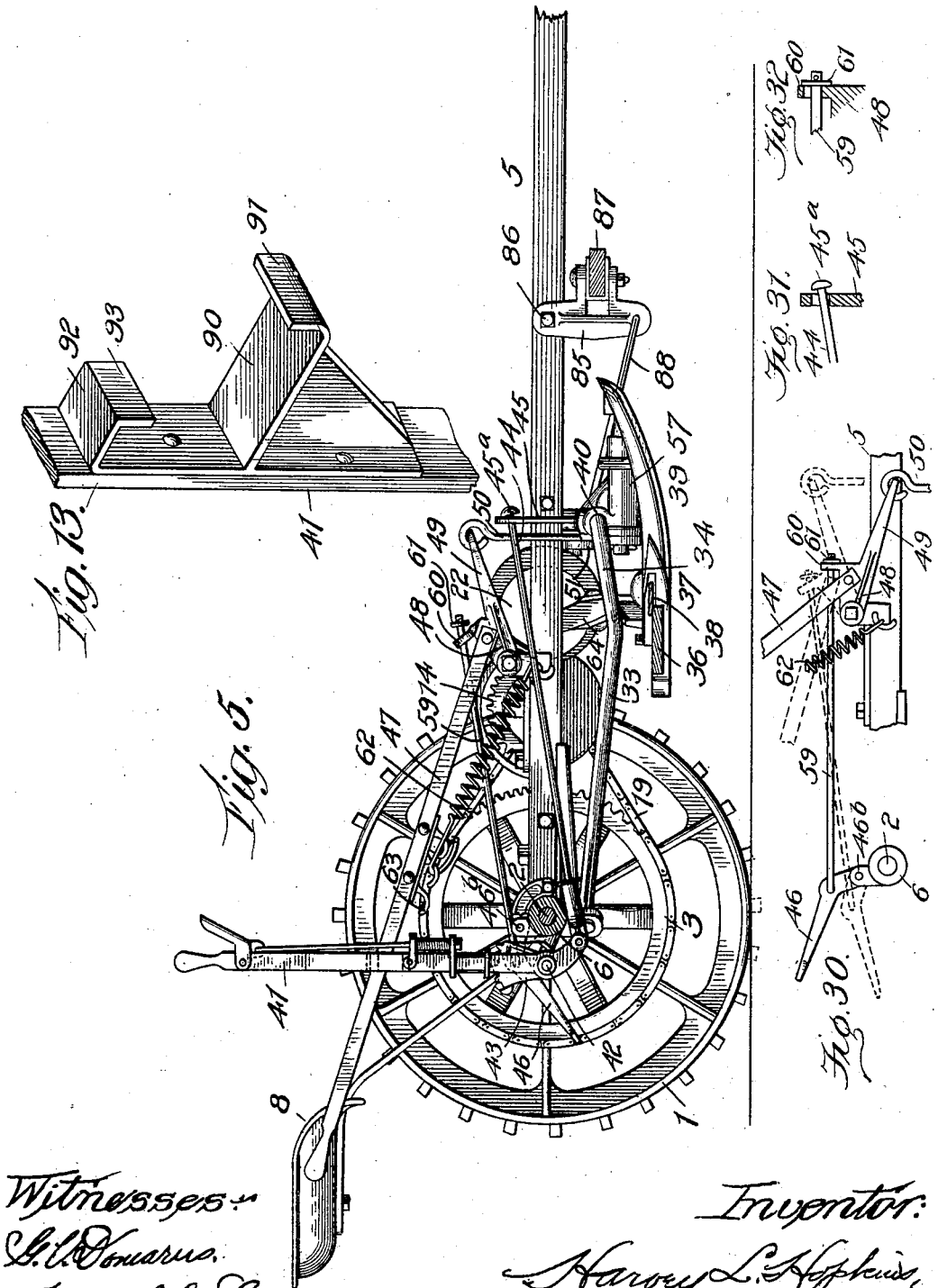

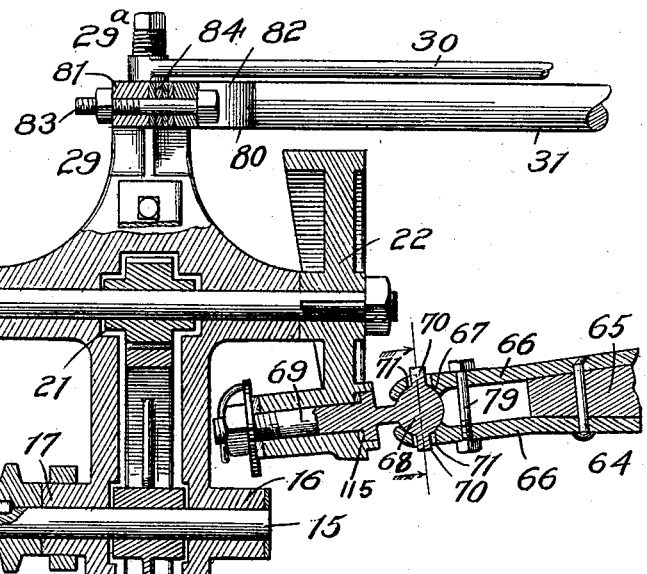

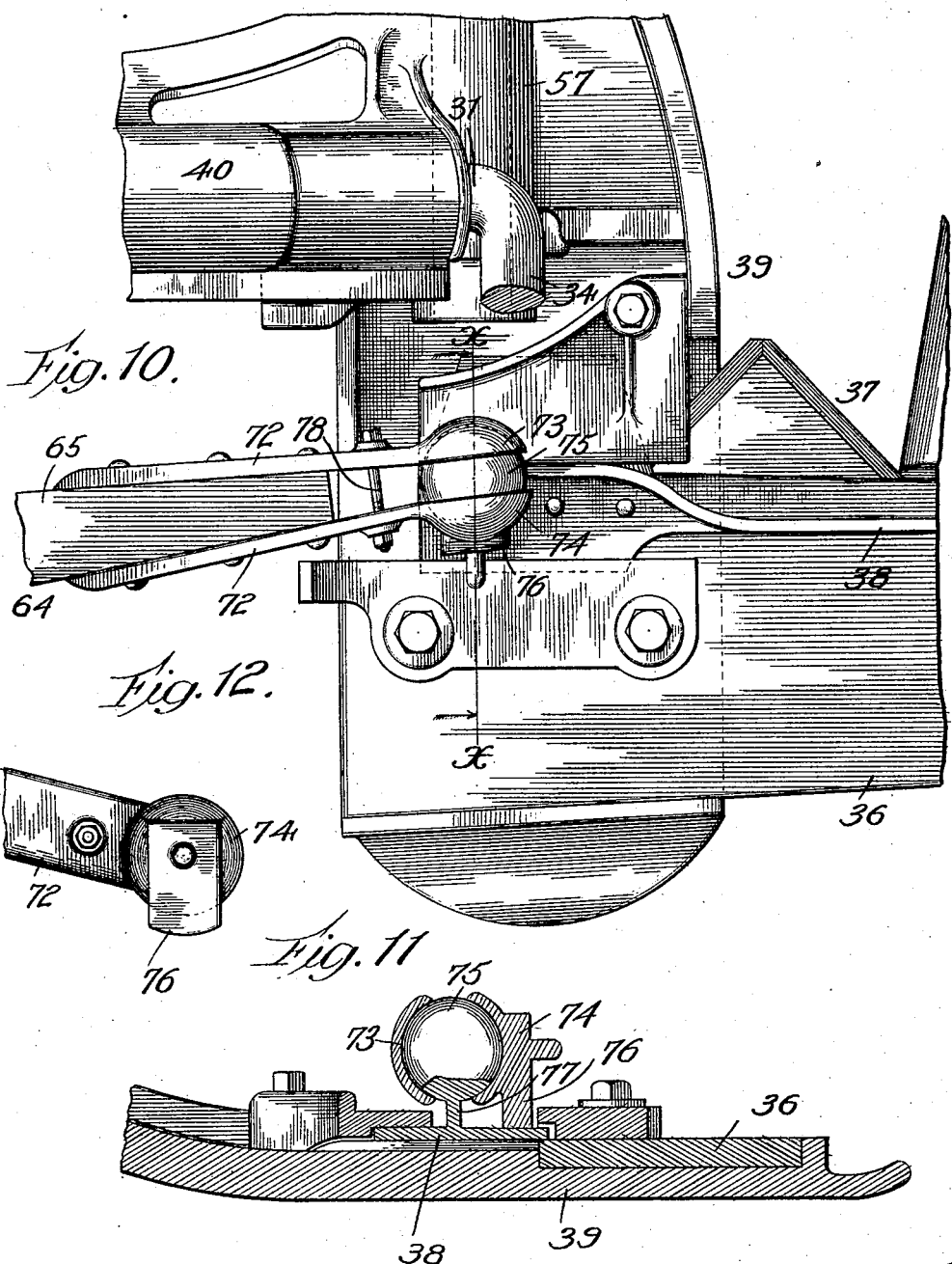

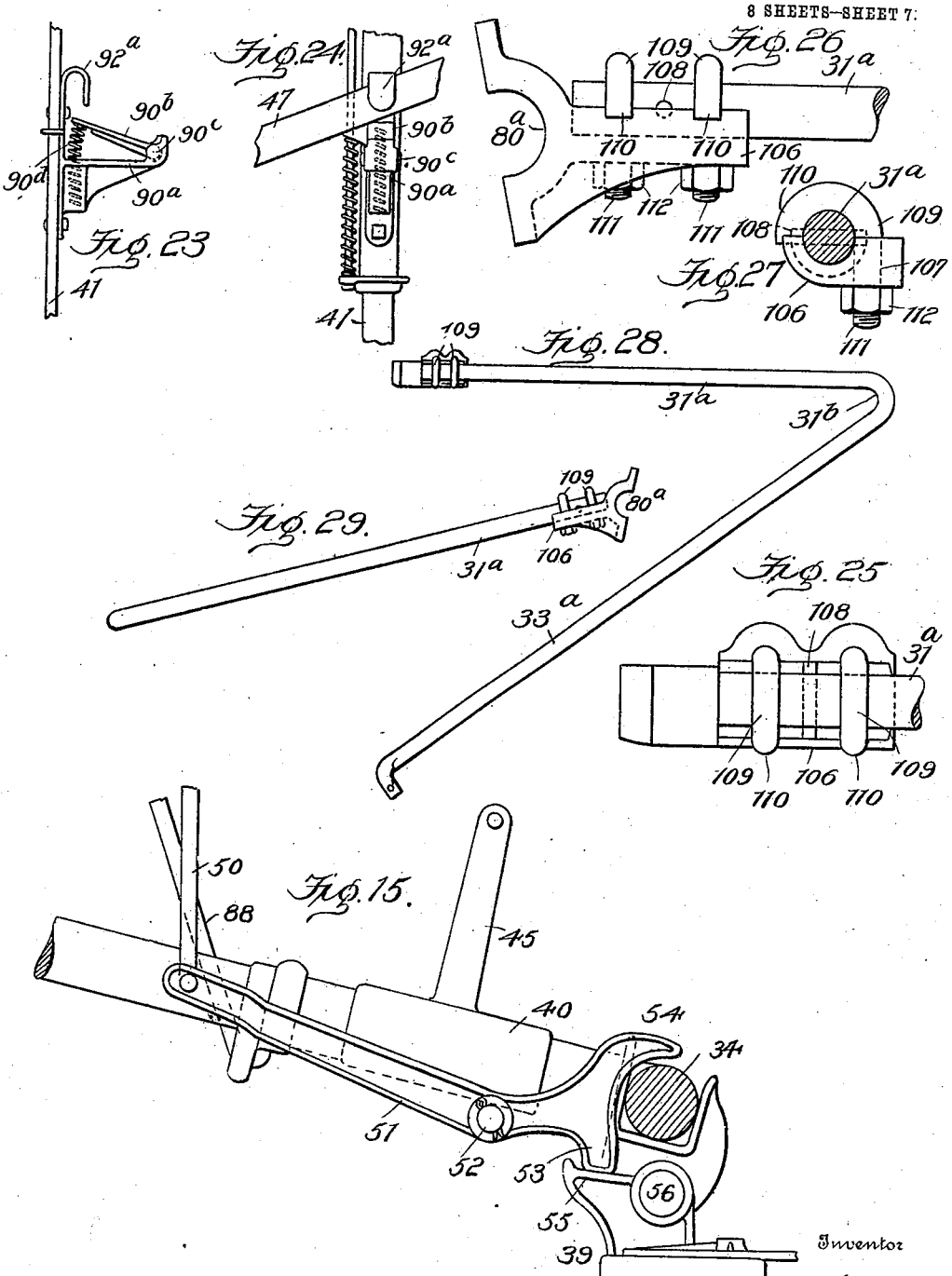

H. L. HOPKINS.
MOWER OR HARVESTER.
APPLICATION FILED FEB. 20, 1905.
980,782.
Patented Jan. 3, 1911.
8 SHEETS—SHEET 8.
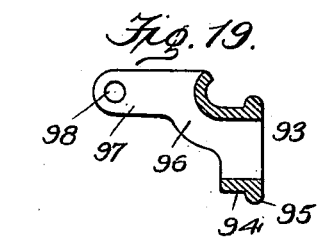
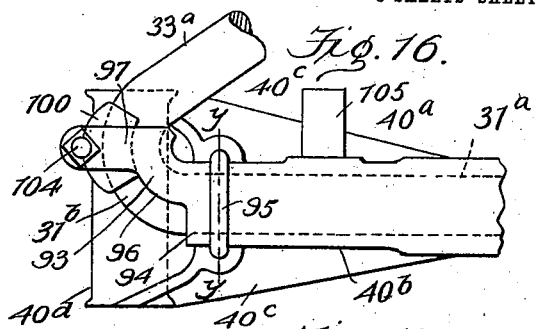
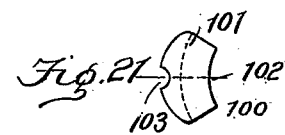
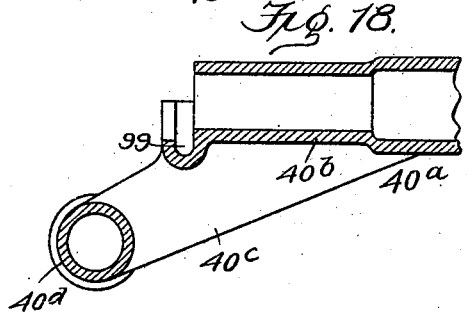
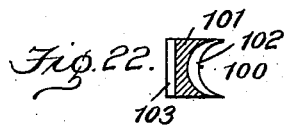
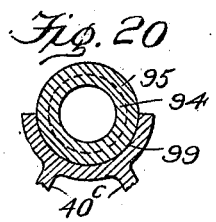
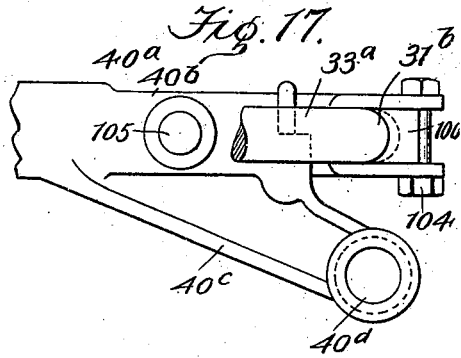
Witnesses
Inventor Harvey L. Hopkins
Attorney

UNITED STATES PATENT OFFICE.

HARVEY L. HOPKINS, OF CHICAGO, ILLINOIS, ASSIGNOR TO THE HOPKINS PATENT COMPANY, A CORPORATION OF ILLINOIS.

MOWER OR HARVESTER.

980,782.  Specification of Letters Patent.  Patented Jan. 3, 1911.

Application filed February 20, 1905. Serial No. 246,533.

*To all whom it may concern:*

Be it known that I, HARVEY L. HOPKINS, a citizen of the United States, residing at Chicago, in the county of Cook and State of Illinois, have invented certain new and useful Improvements in Mowers or Harvesters, of which the following is a specification, reference being had therein to the accompanying drawing.

This invention relates to improvements in mowing machines.

In some respects it pertains more particularly to improvements in machines of the sort which transmit the power to the cutting apparatus through devices such as I have shown in my Patent No. 645,395, granted on the 13th day of March, 1900; but in some other respects the novel features of contruction herein presented are applicable to use in mowers or harvesters of other sorts.

The essential features of construction and the mode of operation of a mower or harvester embodying my improvements will be readily understood from the drawings and the description given below.

Figure 1:
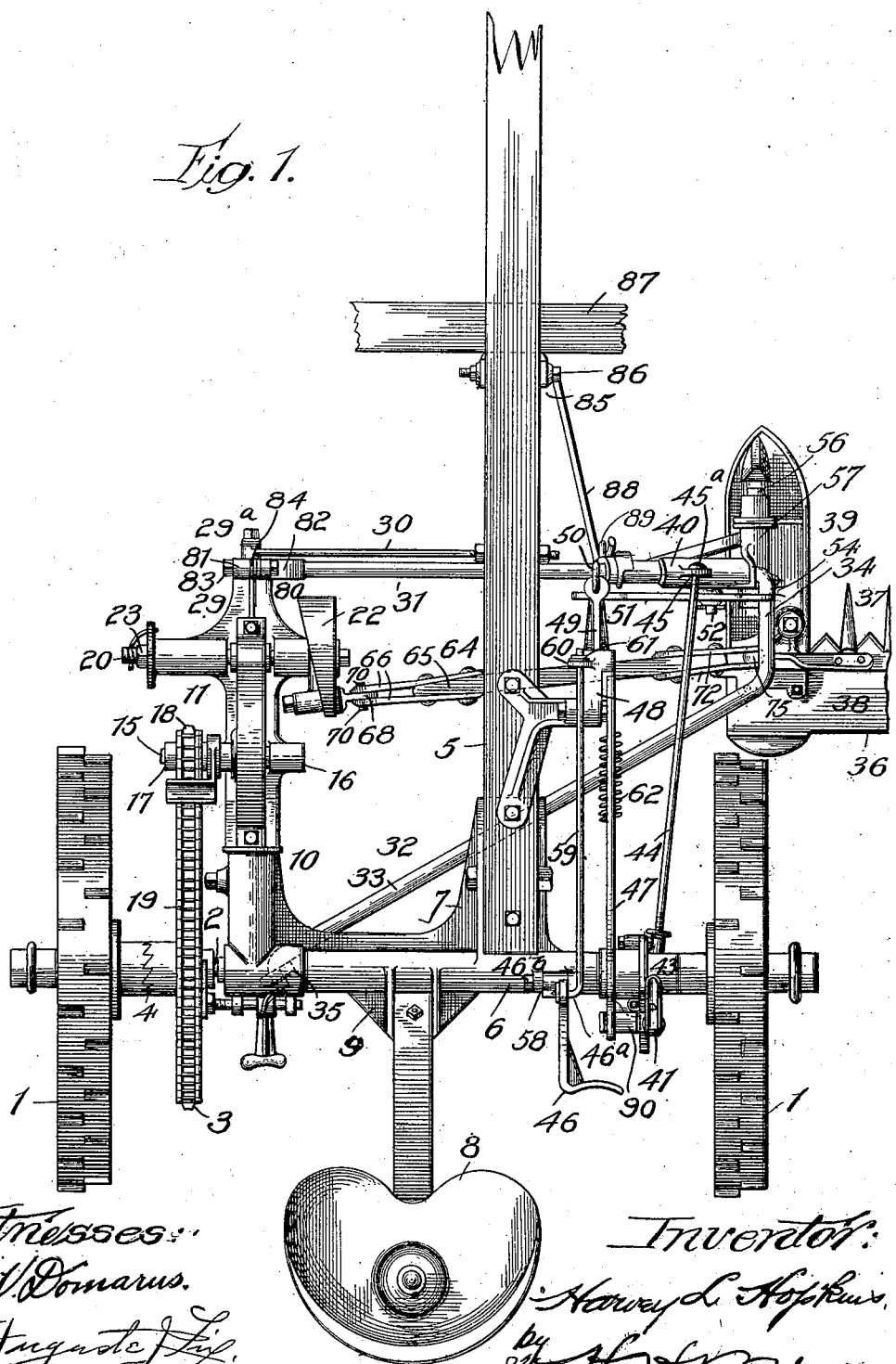
Figure 2:
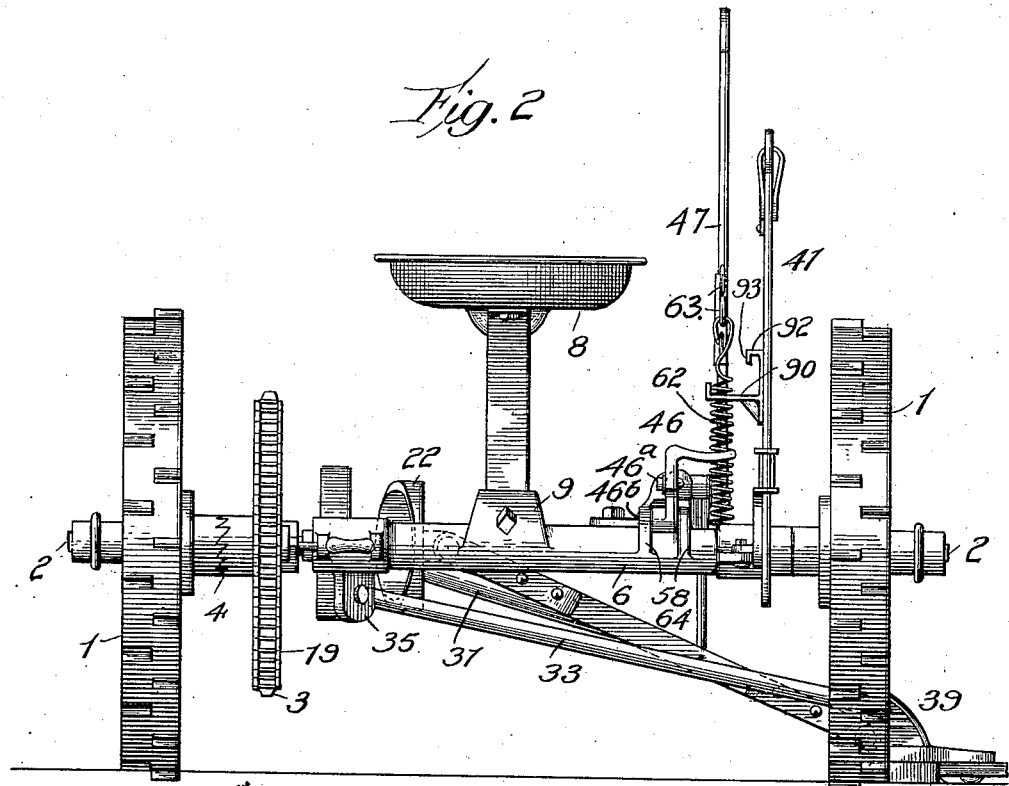
Figure 3:
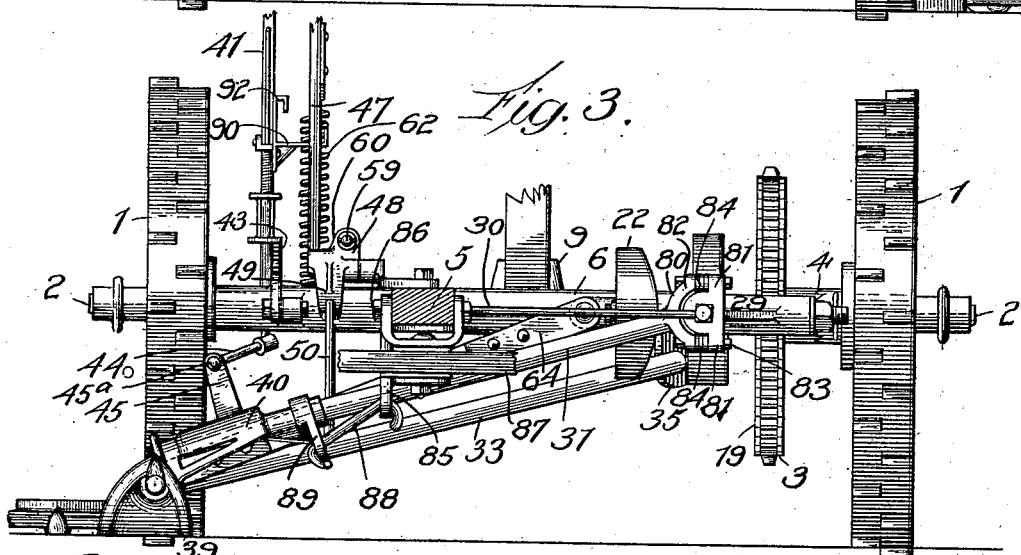

Figure 1 is a top plan view of a mowing machine embodying my improvements, part of the cutting apparatus being omitted. Fig. 2 is a rear elevation, some of the devices at the front being omitted. Fig. 3 is a front elevation. Fig. 4 is an elevation from the cutter side, one ground wheel being removed and the axle being in section, as is also the cutting apparatus. Fig. 5 is a view similar to Fig. 4, except that it shows the cutting apparatus in an elevated position. Fig. 6 is a section of the adjustable gear frame taken on the plane of the axes of the crank shaft and the intermediate shaft, and showing also in section the devices for connecting the pitman to the crank shaft. Fig. 7 is a face view of the nut on the crank shaft and of its locking devices. Fig. 8 shows detached the parts constituting the ball and socket connection between the pitman and the crank head. Fig. 9 is a perspective view of one of the parts of the ball socket Fig. 10 is a plan view of the parts providing a ball and socket connection between the pitman and the sickle bar. Fig. 11 is a sectional view on the line $x$, $x$ of Fig. 10. Fig. 12 is a side view of one part of the socket element shown in Fig. 10. Fig. 13 is a perspective of the parts which serve as a stop and holder or lock for the cutter lifting devices. Fig. 14 is a perspective of the devices for varying the tension of the lifting spring. Fig. 15 is a face view of the gag-lever, showing also in section some of the adjacent parts. Fig. 16 is a plan view of a modification of the connecting device for joining the shoe to the brace frame. Fig. 17 is a side view of the parts in Fig. 16. Fig. 18 is a section of this connecting device. Fig. 19 is a section of the clevis or locking clamp. Fig. 20 is a partial section on the line $y$, $y$ of Fig. 16. Figs. 21 and 22 show the key for locking the clevis to the brace frame. Fig. 23 is a front view, and Fig. 24 is a side view of a modification of the devices shown in Fig. 13 for stopping and holding the lifting lever. Fig. 25 is plan, Fig. 26 a side elevation, and Fig. 27 an end elevation of a modified form of device for securing the end of the brace frame bar to the vibrating or rocking gear frame. Fig. 28 is a plan view of a modified form of the cross-brace frame interposed between the cutting apparatus, the main frame and the rocking gear frame, this being similar to the one shown in Figs. 16 and 17. Fig. 29 is a side elevation of the front bar of the brace frame shown in Fig. 28. Fig. 30 is a side elevation of parts of the cutter bar lifting devices. Figs. 31, 32 and 33 show details.

1, 1, indicate the ground wheels. These are mounted upon the axle 2.

3 indicates the initial wheel of a train of gearing adapted to be connected to the ground wheels by a clutch at 4, the engaging elements of which can be thrown into and out of engagement as desired. These parts are, or may be, of any of the well known forms. Upon the axle is mounted and to it is connected the main or draft frame which comprises the tongue 5 and the sleeve 6, the latter having a forward projecting socket 7 to receive the tongue and also having arms or projections for receiving and holding several of the parts of the machine, such as the seat 8 fastened to the socket extension 9.

The gear frame is indicated as a whole by 11.

10 is a tube or sleeve extending forward from and preferably cast integrally with the transverse axle sleeve 6. The gear frame has a spindle part 12 which is fitted in the tubular bearing 10. It extends forward therefrom and is formed with a box or cavity at 13 to receive the gear wheel 14, secured to the shaft 15, mounted in the bearings 16, 17 in the frame or support 11.

12' is a groove in the periphery of the spindle part 12 and is adapted to receive the end of the stop screw 12$^a$ which serves to hold the spindle part 12 in the proper position within the tubular bearing 10. The groove 12' permits the rocking of the said spindle within the said bearing when the stop screw is set to prevent the removal of the spindle from the bearing.

The shaft 15 has a sprocket pinion 18, which is connected by a chain 19 to the initial transmitting wheel 3, which in this case is a sprocket engaging with the chain.

The section 11 of the gear frame extends forward of the wheel 14 and supports a transversely mounted shaft 20, provided with a gear pinion 21 meshing with the aforesaid wheel 14. This shaft 20 carries the crank disk 22 at one end and at the other end is fastened in position by means of the nut 23, which is secured by the lock 24, consisting of the disk 25 with a row of perforations 26, together with the wire 27, the bent legs 28 of which are adapted to be inserted into one or another of the apertures 26. The section 11 of the gear frame extends still farther forward and has a head 29 and a spindle or short stud-shaft 29$^a$ at its front end, the stud shaft projecting horizontally forward. By means of these the front end of the gear frame is connected both to the tongue frame by the tie rod 30 and to the cutter frame by the brace rod 31, as will be more fully described. This brace rod 31 forms part of what may be regarded as a bracing or coupling frame represented as a whole by 32. Preferably it is formed by bending a suitable bar of wrought metal in such way as to provide the aforesaid part 31 with a long rearwardly inclined part 33 and a longitudinally arranged connecting bar 34. The part 33 is at its rear end supported flexibly at 35, that is to say, supported in such way that the part 34 and the devices connected with it can rise and fall vertically around an axis extending from the attaching point at 35 to the stud shaft or spindle at 29, this axial line being substantially in one of the vertical longitudinal planes of advance of the machine.

The cutting apparatus comprises as usual the bar 36, fingers or guards 37 and a knife bar 38. The bar 36 extends from the shoe 39 at the inner end to a shoe at the outer end, which can be of the ordinary sort.

The shoe 39 is connected to the frame 32 by means of the supporting sleeve 40, which fits loosely on the front transverse brace rod 31. This sleeve can be rocked around the bar 31 by means of the lever 41 and connecting parts. The lever is pivotally mounted at 42 on a support 43 cast with or secured to the axle sleeve 6, and the short lower end of the lever is connected by the link 44 to a crank arm 45, which extends up from the sleeve 40.

The link 44 and the crank arm 45 are connected together in a peculiar manner so as to accomplish an important purpose. It is desirable to have the cutting apparatus, including the inner shoe, the outer shoe, and the bars supported thereby, mounted in such way that it will automatically tilt or vibrate vertically around a horizontal axis parallel to the longitudinal lines of this apparatus. By so mounting it, it becomes possible for the shoes, and even for the guard-fingers, if they come to any obstruction or rise in the ground surface, to tilt upward at the front, permitting them to slide over such obstructions, and without causing excessive strains upon this part of the machine. One of the several ways for accomplishing this is illustrated in the drawings, which show the manually-operated tilting mechanism as being so connected to the cutting apparatus that the operator can apply power thereto for tilting it in one direction, and can also prevent it from moving in the opposite direction beyond a predetermined position. The draft link 44 passes loosely through a relatively enlarged eye or aperture in the crank 45, and on the front side of the latter has a stop or abutment device, at 45$^a$, of such dimensions as to prevent it from slipping through the aperture although the link rod 44 itself is susceptible of such slipping.

It will be seen that the cutting apparatus can rock around the axis of the hinged sleeve 40, while the link 44 is stationary, the crank arm 45 slipping backward and forward along the rod. If the shoes or guard-fingers should come to a knoll or rolling place on the ground surface, they rise up at the front without impediment and pass over it. The tendency for the cutting apparatus to thus tilt or rise upward at the front is checked or controlled by the draft of the horses.

85 is a swinging bar or plate pivoted at 86 to the tongue 5, and to this is attached the double-tree 87. 88 is a link flexibly connected to the lower end of the bar or plate 85, and also to a crank arm 89 formed with or secured to the sleeve 40. Through these connections a part of the draft of the team is transmitted to the cutting apparatus in such way as to tend to hold it in operative position; yet the stress from the draft does not cause such a rigidity as to prevent the bar from tilting upward, as above described. The draft rod 88 is connected to the cutting apparatus at a point just high enough to hold the guards down by the draft. In other words, the finger bar is held at a position closely approaching one of over-balance when normally at work.

The guards can be held at any desired position; that is, they can be prevented from dropping forward beyond a predetermined position by locking the tilting lever 41 at the proper point on its ratchet segment. The tilting lever is available for use in the ordinary way in regulating the height of the cut, but the guards and cutting apparatus are not, in this machine, adapted to be forced downward at the front positively by any action of the tilting lever 41, such downward tilt being given by the draft of the team through the connections above described.

The brace frame 32 and the parts supported by it can be raised and lowered either by means of the foot lever 46 or the hand lever 47. These levers are both connected to an intermediate rocking device 48 pivoted to the tongue and having the arm 49 connected to the link 50, which at its lower end is connected mediately or immediately with the parts to be lifted or lowered. I prefer to connect the link to a gag lever, which is indicated by 51. It is pivoted at 52 to the coupling sleeve 40. In front of its pivot it is formed with two arms, one shown at 53 and one at 54. The arm 53 is arranged and adapted to bear upon a shoulder 55 on the shoe 39, this shoulder lying on the outerside of the hinge bar 56 of the shoe. This hinge bar is seated in the hinge sleeve or tubular bearing 57 on the shoe and is mounted on a longitudinal approximately horizontal axis. The arm 54 of the gag lever 51 extends upward and across more or less of the part 34 of the brace frame 32. These parts are so arranged that when the upward stress is exerted by means of the lifting devices it is first transmitted to the shoe 39 through the lower short arm 53 bearing upon the shoulder 55 on the shoe, the result being that the earlier part of the lifting impulse causes the cutter bar to rise at its outer end a short distance and the sagging down of that end is overcome. After the outer end of the cutting apparatus has been lifted as far as desired, this part of the machine as an entirety, and the inner part of the brace frame, together rise bodily as the lifting stress from the foot lever 46 or the hand lever 47 continues.

The foot lever 46 is pivoted at 46ᵇ to ears cast on the axle sleeve 6. At a point 46ᵃ above its pivot 46ᵇ it is connected to a draft rod 59, which in turn is connected to the rocking device 48. The latter connection is effected by means of an ear 60, having a relatively large aperture through which the rod 59 passes. The rod is prevented from drawing backward through the ear 60 by means of a stop device, such as a washer and pin or nut, or the like at 61; but the ear 60 can move away from the stop device, which is desirable when the rocking plate 48 is being operated by the hand lever 47. This lever is rigidly secured to the rock plate 48 and extends to a point within reach of the driver who occupies the seat at 8. He has his option of pressing downward on the lever 46 with his foot and drawing backward on the rock plate 48 to lift the cutting apparatus, or to accomplish the lifting by his hand through the lever 47. When he employs the foot lever 46, the hand lever will move backward simultaneously with the foot lever. But, on the other hand, if he employs the hand lever alone, the foot lever after reaching its stop, remains stationary as the rod 59 slips through the enlarged aperture in the ear 60.

To assist the operator in lifting the cutting apparatus, use is made of a spring 62. At its lower end it is secured to a hook or projection on the frame, and at its upper end it is connected adjustably to one or another of a series of hooks 63 on the lever 47. The line of the spring, when extended in relation to the line running from the lever pivot to the point of attachment of the spring to the lever, is so disposed that when the cutting apparatus is down, in normal working position, the force exerted by the spring acts substantially along the line of the lever 47, but in the movement of the lever backward and downward the longitudinal axial line of the spring leaves the lever and the angular distance between these parts is increased.

By examining the drawings it will be seen that the foot lever and the parts connected with it are so related that when the operator presses downward upon it he brings the draft rod 59 into such position that the line of its draft is exerted nearly on the line which runs from the ear 60 to the pivot 46ᵇ of the foot lever. At this time the power of the operator's foot has the utmost efficiency and he can control the position of the cutter frame with great accuracy and ease of movement. There is at no time a positive lock and in this respect the mechanism is superior to others with which I am acquainted which have parts which provide such positive lock and which therefore require attention on the part of the operator and also the exertion of power to an extent not desirable. In the present machine he has accuracy of control and by merely removing his foot can instantly lower the cutter frame as desired.

The sickle 38 is reciprocated by the crank disk 22 and the pitman 64. The pitman is formed with the shank part 65 and with cups at the ends with cavities, spherical or partly spherical and adapted to fit corresponding balls. At the crank end the cup or socket is formed partly in one and partly in the other of two metallic bars 66, which are secured to the shank 65, the sockets being shown at 67.

68 is the ball fitted in the sockets at 67. This ball is formed on the end of a pin or bolt 69 which has its bearing in the crank disk. This pin or bolt is not arranged on lines parallel to the axis of the shaft 20, but on lines inclined thereto, the result being that there is a valuable compromise reached with respect to the lines of thrust exerted by the crank disk upon the pitman 64. The eccentricity of the ball 68 to the axis of the shaft 20 insures the reciprocation of the pitman, the axis of rotation of the crank shaft 20 being in a plane above that of the sickle bar, and consequently as the rotating ball 68 travels from its uppermost point to its lowermost it relatively approaches the sickle bar and causes the pitman to thrust the latter outward, and as it travels again to the uppermost position it moves to a position farther away from the sickle bar and causes the pitman to draw the sickle bar inward again. But as the pin or bolt 69 is inclined on a line which approaches the axis of the shaft 20 in the direction of the sickle bar the thrusts exerted upon the pitman are much more advantageously applied than if the bolt or pin was parallel. The ball 68 has pins or trunnions 70 diametrically opposite to each other, these extending through apertures 71 in the socket bars 66. The apertures are considerably larger than the pins or trunnions, so that the pitman is free to take all necessary positions, but the line of the pins 70 being at right angles to the longitudinal line of the pin or bolt 69 they insure that the pitman shall be held from turning and from binding at the neck of the ball. It will be seen by reference to Fig. 6 that the pin 69, with the ball 68 at its end, which constitutes the wrist-pin of the crank, is longitudinally adjustable, its end being screw-threaded and provided with a nut and lock. This capability of adjustment of the wrist-pin makes it possible to set the cutter bar accurately relative to the guard fingers and other stationary parts of the cutting apparatus. Of course washers 115 or equivalent devices will be employed to prevent looseness of parts, such a washer being represented in Fig. 6 between a collar formed on the pin 69 and the face of the crank wheel that sets opposite thereto. At the knife end the pitman has metallic pieces 72 secured to the shank 65 and in the ends of these the ball sockets 73, 74, are formed.

75 is a ball secured to the knife bar and fitted in the sockets at 73, 74. The ball proper is carried by a reduced shank 77 extending downward from it to the knife bar. The socket part 74 has a downward extension 76 of such dimensions as to fit upon or nearly reach the top surface of the knife bar 38. This part 76 serves as a stop and holds the pitman in proper position and prevents it from turning about its axis.

It will be seen that both of the balls, namely that at 68 and that at 75, have their shanks guarded against cutting or wearing and the edges of the cup parts are similarly saved from wear, this being accomplished at the crank end by means of the pins 70 in the apertures 71, and accomplished at the knife end by means of the guard stop 76. Such legitimate wear as occurs from the sliding of the surfaces of the balls and the sockets on each other I can take up by means of the clamping devices at 78 and 79, these being bolts that pass through the socket pieces and are adapted to draw them together slightly when it is desired to take up for wear.

The gear frame or support 11, as above described, is pivotally connected with the draft frame by means of the spindle-like part 12 fitting in the sleeve 10. It is capable of rotating within limits around the axis of this spindle 12. That is to say, the crank shaft 20 can be rocked around an axis transverse to its longitudinal lines. This axis, as will be seen by reference to Fig. 6, lies in a vertical plane that cuts the train of spur gearing mounted in the rocking frame 11. When the inner shoe is raised or lowered the rocking of the crank shaft and gear frame occurs, the motion from the cutter frame being transmitted to the gear frame through the front bar 31 of the brace frame 32. This bar or arm 31 is preferably connected to the gear frame by means of a fork 80 at the end of the rod. The head 29 at the front end of the gear frame or carrier has shoulders 81, to which the legs 82 of the fork are secured by bolts 83. The shoulders 81 lie one above and one below the axis of rocking of the gear frame. When the cutting apparatus is lifted and the brace frame 32 swings up the legs of the fork 80 cause the gear frame or crank shaft carrier to turn around its axis. And the parts last referred to also provide a means for so adjusting the frame or carrier of the crank shaft around its axis of rocking that the throw of the sickle bar can be lengthened or shortened as desired. To accomplish this it is merely necessary to suitably vary the positions of the legs 82 in relation to the shoulders 81 to which they are fastened. This can be done in either of several ways. I prefer to employ sets of washers or liners 84, which are held in place on the bolts 83 and clamped between the fork and the shoulders 81. If the distance of the upper fork leg from its shoulder be increased by inserting more washers or liners the crank shaft will have its operative end thrown and held relatively upward, and at such time the throw of the sickle bar will be lengthened. On the other hand, if the upper fork leg be placed nearer to its shoulder 81 and the lower leg be separated farther from its shoulder the crank shaft will be turned and held in such way that its operative end will be thrown downward somewhat and the reciprocations of the sickle bar will be shortened. The carrier or frame for the crank shaft and the gear has a bearing at its front end in the tie rod 30 through the end of which passes the spindle or stud-shaft $29^a$ above described.

In earlier machines of this class which I devised the support for the crank shaft and the gear was rigid in relation to the main frame, and consequently when the cutter bar was lifted while in operation the throw of the cutters was reduced. This is not desirable under most circumstances, it being more advantageous to give the cutters the same action while they are operating whether they be in their lowermost line or in a more elevated line, as when it is desired to continue cutting while passing over a rise in the ground or over some obstruction, or by which it is desired to pass, without terminating the cutting work. By having the crank shaft supported in gear frame rocked in the way here provided I attain this end.

The downward and backward movement of the cutter lifting levers is limited, this being accomplished preferably by means of a stop 90 secured to the inner side of the tilting lever 41, consisting of an arm or shelf-like plate extending out horizontally across the path of the lifting lever 47. It has an upwardly turned flange or guard arm 91 which assists in holding the lifting lever in place horizontally. The weight of the cutting apparatus tends to draw the lifting levers 46 and 47 back to their uppermost positions, but this can be prevented and the operator can cause the cutting apparatus to be held in elevated points by means of the stop at 92, this being a short horizontally arranged projection also secured to the lever 41 and having downwardly turned guard-flange or bar 93. When the cutting apparatus is to be held in an elevated position the operator draws the lever 47 backward and downward until it strikes the stop 90, and then pushes it laterally until it lies under the stop 92, and then permits it to rise until it bears against the latter; and, after that, the cutting apparatus is held in the position shown in Fig. 5.

Having, as above, set forth a form of mechanism embodying my improvements I now call attention to the fact that in each of several matters there can be modification without departing from the essential features of the invention. Thus, as shown in Figs. 23 and 24, the stopping and locking parts last above described can be modified. Here the horizontal stop plate $90^a$ is supplemented by a hinged bar or plate $90^b$ pivoted at $90^c$; and with it is combined a spring $90^d$ which normally tends to throw the free end of the hinged bar upward. This guards against sudden shocks or blows when the lifting lever 47 is being depressed. The swinging bar $90^b$ is extended toward the lever 41 far enough to insure that when the lifting lever 47 is in the stop-loop at $92^a$ it shall be held therein by the spring so as to prevent accidental displacement.

In Figs. 16 to 22, inclusive, I have shown a modification of the cross brace or coupling frame and the connecting devices which join the inner shoe of the cutting apparatus thereto, the frame being shown entire in Fig. 28. In this case the part 34 of the brace frame is omitted, it having merely the two legs or arms $31^a$ and $33^a$ with a sharp acute angle or bend at $31^b$. The longitudinal hinge bar of the shoe is carried by the casting $40^a$, which is formed with a sleeve-like tubular part $40^b$, the downwardly extending webs $40^c$ and the sleeve-bearing $40^d$ for the shoe hinge. This casting $40^a$ is mounted loosely on the leg $31^a$ of the cross brace frame and is held from moving longitudinally thereon by means of the clevis lock 93. This comprises a collar 94 with a flange or bead 95, a curved neck 96, and two arms 97 with perforations at 98. The flange or bead 95 is seated in a recess 99 formed in the end of the tubular part of the casting $40^a$. 100 is a key having the body 101 and the curved recess 102, and the bolt aperture or socket 103. When in position this key 100 is placed between the arms 97 of the clevis 93 and is held in position by a bolt 104, passing through said arms and engaging with the key. When all of the parts last described are connected up in the way set forth and illustrated, the casting $40^a$ is held against displacement longitudinally on the bar $31^a$, but it is at the same time permitted to swing vertically as required. In assembling these parts and placing them in position on the frame $31^a$ and $33^a$, the clevis 93 is fitted to the casting $40^a$ by slipping the flange or bead 95 laterally into the socket 99; and then they are slipped over the arm $31^a$ of the frame until the bend $31^b$ is reached; and then the key 100 is put in position and locked by means of the bolt 104. At 105 a stud shaft is formed with the casting $40^a$ to receive the gag-lever.

In Figs. 25, 26 and 27, I have shown devices which can be used to advantage for connecting the outer end of the front brace arm (31 or $31^a$) to the rocking gear frame. Instead of making this front bar and the fork 80 integral, as shown in Figs. 1, 3 and 6, they may be made separate from each other as shown in said Figs. 25 and 27.

The fork part is indicated by 80ª and is formed with a semi-cylindrical tube or box part 106, and has apertures, as shown, at 107. The outer end of the frame bar 31ª is secured to this forked part 80ª by laying the end in the half tube or box 106, and pouring Babbitt metal around it, the brace bar being less in diameter than is the cavity in the fork. 108 is a pin passing through and seated in the brace arm, and having its ends arranged to extend somewhat beyond the arm. The pin is covered by or lies in the Babbitt metal, and thus endwise displacement of the brace arm is prevented. Finally, the clamp screws 109 are secured in place, each of these having a curved part 110, which encircles part of the brace bar, and a threaded leg 111 which passes through the metal box or half-tube, and is tightly held in place by the nut 112.

I do not herein claim the crank and pitman mechanism *per se* as it is claimed in my co-pending application, Serial No. 556,787, filed April 21, 1910.

What I claim is:

1. In a harvesting machine, the combination of a main frame, cutting apparatus, means for driving the cutting apparatus including a crank wheel, a train of straight gearing, a pitman extending from the crank wheel to the cutting apparatus, and a gear frame in which the said train of gearing and the crank wheel are mounted arranged to rock on an axis longitudinal of the machine and lying in a vertical plane in which said train of gearing is situated, substantially as set forth.

2. In a mower or harvester, the combination of the main frame, the cutting apparatus, driving gearing for the cutting apparatus including a crank wheel that revolves in vertical planes parallel with the longitudinal movements of the machine, the rocking gear frame supported in bearings at its front end and its rear end, said bearings being in a vertical plane longitudinal of the machine, and the cross brace or coupling frame connected to the cutting apparatus and arranged to swing around the axis of the rocking gear frame, substantially as set forth.

3. In a mower or harvester, the combination of the main frame, the cutting apparatus, the adjustable gear frame swinging around an axis longitudinal of the machine, and the rigid cross brace or coupling frame connected to the cutting apparatus, rigidly connected to the rocking gear frame, and flexibly connected to the main frame, substantially as set forth.

4. In a mower or harvester, the combination of the main frame, the cutting apparatus, the adjustable gear frame vibratable around an axis longitudinal of the machine, and the rigid substantially V-shaped cross brace or coupling frame flexibly connected at or near its apex to the cutting apparatus and at or near the end of one arm to the main frame and rigidly connected at the end of its other arm to the gear frame, substantially as set forth.

5. In a mower or harvester, the combination of the main frame, the cutting apparatus, the gear frame adjustable around an axis longitudinal of the machine, the cutter-driving devices on the gear frame, the pitman interposed between said driving devices and the cutting apparatus, and means for holding the gear frame in either of several positions without changing the position of the non-reciprocating parts of the cutting apparatus, substantially as set forth.

6. In a mower or harvester, the combination of the main frame, the cutting apparatus, the pitman, the driving devices connected to the pitman, the frame for the driving devices, rocking about an axis longitudinal of the machine, and the transversely arranged brace frame connected to the cutting apparatus and flexibly connected to the main frame and adjustably connected to the rocking gear frame whereby it is adapted to hold the rocking gear frame in either of several positions without changing the position of the non-reciprocating parts of the cutting apparatus, substantially as set forth.

7. In a mower or harvester, the combination of the main frame, the ground wheels, the cutting apparatus extending laterally outward from the vertical longitudinal planes of one of said ground wheels, a crank shaft supported on said main frame at points relatively near the other ground wheel disposed substantially parallel with the axle of the ground wheels and mounted to vibrate around an axis transverse to said shaft, a crank carried by said crank shaft, and a pitman connected to said crank and extending therefrom across the central longitudinal planes of the machine and connected with the cutting apparatus, substantially as set forth.

8. In a mower or harvester, the combination of a main frame, cutting apparatus, cutter driving gearing supported by the main frame, a pitman connecting the said gearing to the cutting apparatus, a rotary crank pin carrier and a crank pin connected with the pitman and supported in the said rotary carrier, the longitudinal axis of the crank pin extending in the general direction of the longitudinal axis of the pitman, and means for adjusting the said crank pin in its carrier in the direction of its longitudinal axis to vary the position of the pitman and the reciprocating part of the cutting apparatus with which it is connected, substantially as set forth.

9. In a mower or harvester, the combination of a main supporting frame, a cutting apparatus, a train of gearing comprising a crank shaft the axis of which is substantially parallel with the lines of reciprocation of the moving parts of the cutting apparatus, a pitman connecting the crank shaft with the reciprocating parts of the cutting apparatus, and a crank-pin between the pitman and the crank shaft, the crank shaft pin having a fixed inclination relative to the axis of the crank shaft, substantially as set forth.

10. In a mower or harvester, the combination of the main frame, the cutting apparatus, the pitman, means for imparting rotation to the power receiving end of the pitman in planes transverse thereto, and means for varying the inclination of the circle of rotation of said power receiving end to the horizontal, substantially as set forth.

11. In a mower or harvester, the combination of the main frame, the cutting apparatus, the crank shaft, the pitman connected to the cutting apparatus and having its power receiving end arranged to rotate around the axis of the crank shaft in planes transverse to the pitman, and means for varying the path of rotation of said power receiving end in relation to the horizontal and to the lines of reciprocation of the cutters without varying said path of rotation in relation to the crank shaft, substantially as set forth.

12. In a mower or harvester, the combination of the main frame, the cutting apparatus, the pitman, the crank shaft having its axis situated in a vertical plane approximately parallel to the path of reciprocation of the cutters, a connecting device connecting the pitman to the crank shaft and rotating around said shaft, and means for varying the position of the path of rotation of said connecting device in relation to the horizontal and to the lines of reciprocation of the cutters without varying said path of rotation in relation to the crank shaft, substantially as set forth.

13. In a mower or harvester, the combination of the main frame, the cutting apparatus, the pitman, the crank shaft having its axis in a vertical plane approximately parallel with the paths of reciprocation of the cutters, a connecting device between the crank shaft and the pitman, and means for varying the position of the axis of the crank shaft relative to the horizontal and to the lines of reciprocation of the cutters without varying its position in relation to the path of rotation of said connecting device, substantially as set forth.

14. In a mower or harvester, the combination of the main frame, the cutting apparatus, the pitman, the crank shaft having its axis in a vertical plane approximately parallel with the paths of reciprocation of the cutters, adjusting devices for varying the position of the circle of rotation of the power receiving end of the pitman in relation to the lines of the cutting apparatus when in any given position, and means for locking the adjusting devices in either of several different positions, substantially as set forth.

15. In a mower or harvester, the combination of the main frame, the cutting apparatus, a rising and falling coupling frame between the main frame and the cutting apparatus, a hand-lever pivoted to the main frame for vertically adjusting the coupling frame and cutting apparatus and provided with an aperture, a foot-lever connected to the frame, and a connecting rod 59 between the foot-lever and the hand-lever, said rod passing through the aperture in the hand-lever and being provided at its outer end with a stop device whereby the rod is free to move in one direction relative to the said projection but is stopped against movement in the opposite direction, substantially as set forth.

16. In a mower or harvester, the combination with the main frame, and the cutting apparatus adapted to be bodily raised and lowered and to be tilted around a horizontal axis transverse to the machine, of a device for tilting the cutting apparatus around said axis, and devices for bodily lifting the cutting apparatus, the tilting devices and the lifting devices being arranged to mutually interlock, substantially as set forth.

17. In a mower or harvester, the combination with the main frame, and the cutting apparatus, adapted to be bodily lifted and also adapted to rock around a horizontal axis, of a lifting device for bodily lifting the cutting apparatus, and a tilting device, said tilting device being provided with stops for engaging with the lifting device and holding the cutting apparatus in its elevated position, substantially as set forth.

18. In a mower or harvester, the combination with the main frame, and the cutting apparatus, of the tilting lever having stops 90 and 92, and a stop 93, and the lifting lever adapted to be engaged with said stops and to be held in place thereby, substantially as set forth.

19. In a mower or harvester, the combination with the main frame, and the cutting apparatus, of the swinging frame formed of a bent wrought bar, in combination with the cast socket piece connected to the wrought bar by Babbitt metal, or its equivalent, and stops, substantially as set forth.

20. In a mower or harvester, the combination with the gear supporting frame and the cutting apparatus, of the wrought metal coupling rod extending from the cutting apparatus to said frame, the socket piece 106 at one end of the rod, and means comprising bolts 109, stops 108, and a soft metal filling for securing the socket piece to the rod, substantially as set forth.

21. In a mower or harvester, the combination of the main frame, a cutting apparatus, mechanism for driving the cutting apparatus comprising a pitman, a crank mounted to turn in planes approximately parallel to the longitudinal movements of the machine, a wrist pin rotatably mounted in the crank and inclined to the axis about which the crank turns, and a flexible connection between the wrist-pin and pitman, substantially as set forth.

22. In a harvesting machine, the combination of a main axle, a main frame, a cutting mechanism, a driving gearing for the cutting mechanism including a crank wheel that revolves in vertical planes parallel with the longitudinal movements of the harvester, a pitman connecting the crank wheel and the cutting mechanism, and bearings in which the crank wheel is mounted pivotally connected with the main frame, substantially as set forth.

23. In a harvesting machine, the combination of a main axle, a main frame, a cutting mechanism, gearing for driving the cutting mechanism including a crank wheel that revolves in vertical planes parallel with the longitudinal movements of the harvester, a pitman connecting the cutting mechanism and the crank wheel, and supporting bearings for the crank wheel pivotally mounted on an axis parallel with the planes in which the crank wheel revolves, substantially as set forth.

24. In a harvesting machine, the combination of a main frame, a main axle, a cutting mechanism, gearing for driving the cutting mechanism including a crank wheel rotating in vertical planes parallel with the longitudinal movements of the harvester, a pitman connecting the crank wheel and the cutting mechanism, a frame carrying the bearings for the crank wheel movable about an axis parallel with the longitudinal movements of the machine, and means connecting the last-named frame with the cutting mechanism and arranged to cause the frame to rock as the cutting mechanism is moved up and down, substantially as set forth.

25. In a harvesting machine, the combination with a main frame, a main axle, a cutting mechanism, gearing for driving the cutting mechanism including a crank wheel that rotates in vertical planes parallel with the longitudinal movements of the harvester, a pitman connecting the crank wheel and the cutting mechanism, an auxiliary frame in which are the bearings for the crank wheel pivotally supported on an axis parallel with the longitudinal movements of the machine, and a rigid arm extending from the auxiliary frame to the cutting mechanism with which it is connected, and arranged to maintain the angular relations between the pitman, cutter bar connections and crank wheel, substantially as set forth.

26. In a harvesting machine, the combination of a main frame, a main axle, a cutting mechanism, a driving gear for the cutting mechanism, including a crank wheel that revolves in vertical planes parallel with the longitudinal movements of the harvester, a pitman connecting the cutter and the said crank wheel, and an auxiliary frame in which are the bearings for the shaft of the crank wheel supported on a pivot, the axis of which is transverse to the main axle, the driving gear including also a sprocket chain intermediate the main axle and a shaft supported in the said auxiliary frame, substantially as set forth.

27. In a harvesting machine, the combination with a main frame, a main axle, a cutting mechanism, gearing for driving the cutting mechanism including a crank wheel that rotates in vertical planes parallel with the longitudinal movements of the harvester, a pitman connecting the crank wheel and the cutting mechanism, an auxiliary frame in which are the bearings for the crank wheel pivotally supported on an axis parallel with the longitudinal movements of the machine, and an arm extending laterally from the auxiliary frame with which it has a connection that prevents vertical movement of one relative to the other, the arm being at its outer end connected with the inner end of the cutting mechanism by a joint that permits the cutter bar to be turned up on said joint, substantially as set forth.

28. In a harvesting machine, the combination of a main axle, a main frame, a tongue rigidly connected to the main frame, cutting mechanism, driving gearing for the cutting mechanism including a crank wheel that revolves in vertical planes parallel with the longitudinal movements of the harvester, a pitman connecting the crank wheel and the cutting mechanism, and bearings in which the crank wheel is mounted pivotally connected with the main frame, substantially as set forth.

29. In a harvesting machine, the combination of a main axle, a main frame pivoted on the main axle, a tongue rigidly connected to the main frame, a cutting mechanism, driving gearing for the cutting mechanism including a crank wheel that revolves in vertical planes parallel with the longitudinal movements of the harvester, a pitman connecting the said crank wheel and the cutting mechanism, an auxiliary frame in which the said crank wheel is mounted pivotally connected with the main frame, and a brace rod rigidly connected at one end with the tongue and at its opposite end pivotally connected with the auxiliary frame in the line of the axis of the pivot of the latter, substantially as set forth.

30. In a harvesting machine, the combination of a main frame, a main axle, a cutting mechanism, gearing for driving the cutting mechanism including a crank wheel rotating in vertical planes parallel with the longitudinal movements of the harvester, a pitman connecting the crank wheel and the cutting mechanism, a frame carrying the bearings for the crank wheel pivotally connected with the main frame, and means connecting the last-named frame with the cutting mechanism and arranged to cause the frame to rock as the cutting mechanism is moved up and down, substantially as set forth.

31. In a harvesting machine, the combination of a main axle, a main frame pivoted on the main axle, a tongue rigidly connected to the main frame, a cutting mechanism, driving gearing for the cutting mechanism comprising a crank wheel rotating in planes transverse to the longitudinal axis of the cutting mechanism, a pitman connecting the said crank wheel and the cutting mechanism, an auxiliary frame in which the said crank wheel is mounted pivotally connected with the main frame, and a brace rod rigidly connected at one end with the tongue and at its opposite end pivotally connected with the auxiliary frame in the line of the axis of the pivot of the latter, substantially as set forth.

32. In a mower or harvester, the combination of the cutting apparatus comprising a finger bar and reciprocating knife bar, means for driving the knife bar comprising a crank and a pitman directly connected at one end to the crank and at its other end to the knife bar, and means for varying the length of stroke of the knife bar without movement of the finger bar and without changing the radial throw of the crank, substantially as set forth.

33. In a mower or harvester, the combination of a main frame, cutting apparatus comprising a finger bar and a reciprocating knife bar, cutter driving gearing comprising a pitman and a crank rotating in a plane transverse to the pitman, and means for connecting the crank and pitman adjustable with respect to the plane of rotation of the crank to effect an adjustment of the knife bar longitudinally of the finger bar, substantially as set forth.

34. In a mower or harvester, the combination of a pair of ground wheels, a main frame mounted thereon, cutting mechanism comprising finger and knife bars extending outward from a point adjacent one of the ground wheels, a gear frame pivoted to the main frame on an axis longitudinal of the machine, a crank mounted to rotate in the gear frame in a plane transverse to the longitudinal axis of the cutting mechanism, said gear frame and crank being disposed near the other ground wheel, means for driving the crank from the ground wheels, a coupling frame rigid with the gear frame and pivotally connected to the finger bar, and a pitman directly connected at one end to the crank and at the other end to the knife bar, substantially as set forth.

35. In a mower or harvester, the combination of a main frame, cutting mechanism comprising finger and cutter bars, a gear frame pivoted to the main frame on an axis longitudinal of the machine, a crank mounted to rotate in the gear frame in an approximately vertical plane transverse to the longitudinal axis of the cutting mechanism, the crank axis being normally above the plane of the cutter bar, means for driving the crank from the ground wheels, a coupling frame connecting the gear frame and the finger bar, and a pitman directly connected at one end to the crank and at the other end to the knife bar, substantially as set forth.

36. In a mower or harvester, the combination of a main frame, cutting mechanism comprising finger and cutter bars, a gear frame pivoted to the main frame on an axis longitudinal of the machine, a crank mounted to rotate in the gear frame in a plane transverse to the longitudinal axis of the cutting mechanism, the center of rotation of said crank being disposed relatively close to the pivotal axis of the gear frame, means for driving the crank from the ground wheels, a coupling frame connecting the gear frame and the finger bar, and a pitman directly connected at one end to the crank and at the other end to the knife bar, substantially as set forth.

37. In a mower or harvester, the combination of a main frame, cutting apparatus comprising finger and knife bars, a gear frame pivoted to the main frame on an axis longitudinal of the machine, a crank mounted to rotate in the gear frame in a plane transverse to the longitudinal axis of the cutting mechanism, means for driving the crank from the ground wheels, a coupling frame to which the cutting mechanism is hinged and which is rigidly secured to the gear frame at the front end thereof and pivotally connected to the rear part of the main frame, and a pitman directly connected at one end to the crank and at the other end to the knife bar, substantially as set forth.

In testimony whereof I affix my signature in presence of two witnesses.

HARVEY L. HOPKINS.

Witnesses:
CHAS. H. POPE,
MERWIN D. HOPKINS.